Patented Dec. 23, 1947

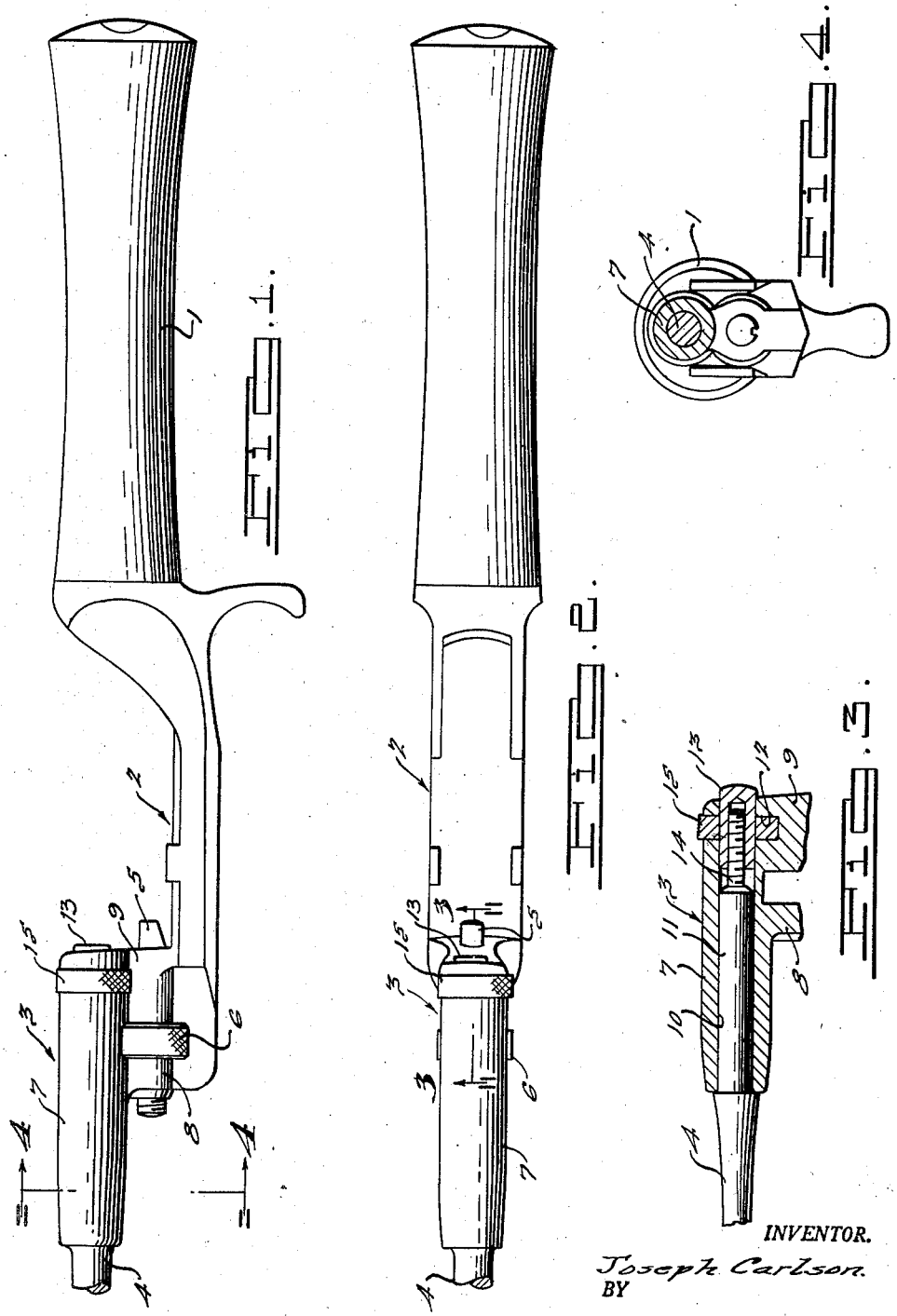

2,433,197

UNITED STATES PATENT OFFICE 2,433,197

HANDLE FOR FISHING RODS

Joseph Carlson, Grosse Pointe Farms, Mich.

Application January 9, 1946, Serial No. 640,041

1 Claim. (Cl. 43—23)

The present invention relates to a fishing rod handle having improved means for securing a removable rod thereto.

The general object of the present invention is to provide an improved mechanism for locking a fishing rod to a handle, which mechanism is characterized by its extreme simplicity, the fact that it is rugged and inexpensive to manufacture, and the fact that it does not involve any projecting parts which might catch on the fisherman's clothing or be injured by striking against objects during use or shipment.

Other objects and advantages will become apparent from the following specification, the accompanying drawings, and the appended claim.

In the drawings:

Figure 1 is a side elevation of the improved handle showing a portion of the fishing rod mounted therein;

Figure 2 is a plan view of the construction shown in Figure 1;

Figure 3 is a fragmentary section taken on the line 3—3 of Figure 2; and

Figure 4 is a section taken on the line 4—4 of Figure 1.

Referring to the drawings, the handle of the present invention comprises three main portions, namely a grip 1 which may be of any suitable material such as compressed cork; a reel seat 2; and a socket portion 3 adapted to receive the butt of the rod indicated at 4. The entire handle construction including the shank portion, not shown, which projects within the grip 1, is preferably formed as a single integral casting. Associated with the reel seat is a reel locking plunger 5 which is slidable within a suitable bore under the influence of a thumb nut 6 in the manner more fully set forth in applicant's prior Patent Number 1,920,966 granted August 8, 1933.

The present invention relates to the means associated with the rod socket 3 by which the butt end of the rod is securely locked to the handle. As best shown in Figures 3 and 4, the socket portion 3 comprises a generally tubular projection 7, the rearward portion of which is integrally connected to the reel seat portion 2 of the handle by means of a pair of connecting portions 8 and 9. The connecting portions 8 and 9 are spaced apart to provide a slot for reception of the previously mentioned thumb nut 6. The tubular portion 7 is provided with an axial bore 10 which is a straight cylindrical hole drilled entirely through the tubular projection and is of proper diameter to fit the cylindrical butt 11 of the rod 4. The rear portion of the tubular projection 7 is provided with a transverse slot 12 which extends entirely across the projection from one side to the other intersecting the bore 10 and which is located in close proximity to the rear end of the bore 10. An internally threaded sleeve 13 fits freely within the rear portion of the bore 10 and is adapted to be threaded on a threaded stem 14 which is integral with the butt end 11 of the rod 4. A thumb wheel 15 is securely press fitted about the sleeve 13 and lies within the transverse slot 12, thus serving to hold the sleeve 13 against axial movement within the bore 10. The diameter of the thumb wheel 15 is slightly in excess of the diameter of the cylindrical portion 7 with the result that the knurled periphery of the wheel may be grasped and rotated in order to thread the sleeve 13 on the stem 14 or vice versa.

It will be observed that the mechanism is exceedingly simple to manufacture and assemble. It is only necessary to position the thumb wheel within the slot 12 and then insert the sleeve 13 through the rear end of the bore and press it into the thumb wheel 15 to provide a permanent press fit connection between the thumb wheel and the sleeve. This completes the assembly.

It will also be noted that the mechanism provides a positive and readily operated means for locking or releasing the rod from the handle and that it provides a neat appearing, rugged construction having no projecting parts. After assembly, the sleeve 13 holds the thumb wheel against displacement from the slot 12 and the thumb wheel holds the sleeve against displacement from the opening 10.

What is claimed is:

A fishing rod handle having a generally tubular rod socket portion provided with an axial opening extending therethrough, said tubular portion having a transverse slot cut entirely through the top and both sides thereof adjacent its rear end, an annular thumb wheel having a smooth cylindrical axial bore and positioned within said slot in axial alignment with said opening, said thumb wheel being of a larger diameter than the width of said rod socket portion at said slot, and an internally threaded cylindrical sleeve located within and supported by said axial opening at both sides of said slot and press fitted within said thumb wheel, said sleeve being freely rotatable within said opening and being adapted to receive the threaded extremity of a fishing rod fitted within said opening.

JOSEPH CARLSON.

REFERENCES CITED

The following references are of record in the file of this patent:

UNITED STATES PATENTS

| Number | Name | Date |
|---|---|---|
| 2,194,639 | Cole | Mar. 26, 1940 |
| 933,649 | Knott | Sept. 7, 1909 |